(12) United States Patent
Xie

(10) Patent No.: US 10,381,920 B2
(45) Date of Patent: Aug. 13, 2019

(54) POWER LIMITING CIRCUIT FOR AN INVERTER DEVICE, AND INVERTER DEVICE

(71) Applicant: Shenzhen Yinamic Technology Co., Ltd., Guangdong (CN)

(72) Inventor: Jun Xie, Guangdong (CN)

(73) Assignee: SHANGHAI SUNSON ACTIVATED CARBON TECHNOLOGY CO., LTD, Shanghai (CN)

( * ) Notice: Subject to any disclaimer, the term of this patent is extended or adjusted under 35 U.S.C. 154(b) by 55 days.

(21) Appl. No.: 15/544,077

(22) PCT Filed: Dec. 26, 2016

(86) PCT No.: PCT/CN2016/112057
§ 371 (c)(1),
(2) Date: Jul. 17, 2017

(87) PCT Pub. No.: WO2018/058819
PCT Pub. Date: Apr. 5, 2018

(65) Prior Publication Data
US 2018/0269777 A1    Sep. 20, 2018

(51) Int. Cl.
*H02M 1/32* (2007.01)
*H02M 1/36* (2007.01)
(Continued)

(52) U.S. Cl.
CPC .............. *H02M 1/32* (2013.01); *H02M 1/36* (2013.01); *H02M 7/53871* (2013.01);
(Continued)

(58) Field of Classification Search
CPC ...... H02M 1/32; H02M 1/36; H02M 7/53871; H02M 2001/007; H02M 1/34;
(Continued)

(56) References Cited

U.S. PATENT DOCUMENTS 4,788,485 A * 11/1988 Kawagishi ............ H02M 1/425
  318/807
5,592,353 A * 1/1997 Shinohara .............. G06F 1/305
  361/23
(Continued)

FOREIGN PATENT DOCUMENTS

JP    2012151592 A * 8/2012 ............. H03K 17/08

*Primary Examiner* — Gary L Laxton
*Assistant Examiner* — Ivan Laboy
(74) *Attorney, Agent, or Firm* — Reches Patents

(57) ABSTRACT

The present invention provides a power limiting circuit for inverter device and an inverter device, which pertains to the technical field of power source inverting. The inverter device comprises a first logic judging circuit for comparing an input current of an inverter circuit with a first preset current threshold and outputting a first signal when said input current is larger than the first preset current threshold; and a shunt circuit for shunting a portion of the input current of the inverter circuit when receiving said first signal; wherein, the shunt circuit comprises a shunt resistance and a first controllable switch, the shunt resistance and the first controllable switch are connected in series and then parallel-connected to input ends of the inverter circuit, a control end of the first controllable switch is connected to an output end of the first logic judging circuit for controlling the first controllable switch to be connected when receiving said first signal. This circuit enables the inverter device to be directly loaded with an inductive load, while an industrial frequency transformer can be dispensed with, so that the weight of the inverter device is greatly reduced, which allows the inverter device to be easy to move and carry around.

9 Claims, 6 Drawing Sheets

(51) Int. Cl.
  *H02M 7/5387* (2007.01)
  *H02M 1/34* (2007.01)
  *H02M 1/00* (2006.01)

(52) U.S. Cl.
  CPC ........ *H02M 1/34* (2013.01); *H02M 2001/007* (2013.01); *H02M 2001/325* (2013.01); *H02M 2001/344* (2013.01)

(58) Field of Classification Search
  CPC ..... H02M 2001/322; H02M 2001/325; H02M 2001/342; H02M 2001/344; H02M 7/5387; H02M 2003/1566
  USPC .......... 363/50–56.12; 361/18, 23–24, 30–31, 361/33, 54–58, 71–75, 78–79, 86–87, 361/93.1, 93.4, 93.7, 93.9, 111; 318/56–57, 60, 63, 86–88, 101, 103, 134, 318/258, 261, 264, 269, 272–273, 275, 318/277, 362–363, 370–371, 375, 400.03, 318/400.09, 400.1, 400.21, 400.22, 318/400.26, 400.27, 400.29, 703, 722, 318/741, 757–762, 765, 784–786, 318/800–803, 807, 810–811
  See application file for complete search history.

(56) References Cited

U.S. PATENT DOCUMENTS

| | | | | |
|---|---|---|---|---|
| 9,680,405 | B2* | 6/2017 | Yanagi | H02P 6/24 |
| 2009/0167225 | A1* | 7/2009 | Dooley | H02P 25/024 |
| | | | | 318/400.25 |
| 2013/0114308 | A1* | 5/2013 | Liao | H02M 3/33507 |
| | | | | 363/21.01 |
| 2014/0063747 | A1* | 3/2014 | Sotome | H05K 7/2039 |
| | | | | 361/720 |
| 2015/0035539 | A1* | 2/2015 | Wakida | G01R 31/327 |
| | | | | 324/418 |
| 2015/0109708 | A1* | 4/2015 | Cheng | H02M 1/10 |
| | | | | 361/93.9 |
| 2015/0214882 | A1* | 7/2015 | Suzuki | B62D 5/046 |
| | | | | 318/139 |

\* cited by examiner

POWER LIMITING CIRCUIT FOR AN INVERTER DEVICE, AND INVERTER DEVICE

TECHNICAL FIELD

The present invention pertains to the technical field of power source inverting, and in particular relates to a power limiting circuit for inverter device and an inverter device.

BACKGROUND

An inverter circuit is used to convert the electric power (direct current) stored in an electric power storing device into alternate current so as to supply alternate current power to loads. The utility model patent with a publication number of CN203951381U discloses an on-board inverter system, as shown in FIG. 1, which comprises a direct current power source 1, a filter circuit 2, a Boost circuit 3, a DC-DC Boost circuit 4, a DC-AC inverter circuit 5, an alternate current filter circuit 6, a voltage measuring circuit 11 and a controller 10 for controlling the Boost circuit 3, the DC-DC Boost circuit 4 and the DC-AC inverter circuit 5.

Because an inductive load (such as a motor) has very large starting current (normally 4-7 times of the rated current), it also has very large starting power which is much larger than the rated power of the inverter circuit and may cause damage to circuit components.

In prior arts, in order to solve the above-mentioned problem, an industrial frequency transformer is arranged at the input side of the DC-AC inverter circuit 5, so as to enable the inverter circuit to be loaded with an inductive load by utilizing the transformer's characteristic of outputting a reduced voltage when the load current increases. However, the industrial frequency transformer is bulky and has a large weight, which brings about inconvenience of being carried around and moved.

SUMMARY OF THE INVENTION

Therefore, the technical problem to be solved by the present invention is that, when direct current power stored in an energy-storing battery is converted into alternate current power to supply power to a load, the electric power is not suitable to be supplied to an inductive load, and if an industrial frequency transformer is used to solve the problem of how to load the circuit with an inductive load, the transformer would cause the power supply device to have a large weight and be inconvenient to move and carry around.

Thus, the embodiments of the present invention provide the following technical scheme:

A power limiting circuit for an inverter device comprises:

a first logic judging circuit for comparing an input current of an inverter circuit of the inverter device with a first preset current threshold and outputting a first signal when said input current is larger than the first preset current threshold; and a shunt circuit for shunting a portion of the input current of the inverter circuit when receiving said first signal; wherein, the shunt circuit comprises a shunt resistance and a first controllable switch, a first end of the shunt resistance is connected to a first end of the first controllable switch, a second end of the shunt resistance is connected to one input end of the inverter circuit, a second end of the first controllable switch is connected to the other input end of the inverter circuit, a control end of the first controllable switch is connected to an output end of the first logic judging circuit for controlling the first controllable switch to be connected when receiving said first signal.

Optionally, the control end of the first controllable switch is also connected to a processor of the inverter device for disconnecting the first controllable switch after a preset duration of connection of the first controllable switch.

Optionally, the power limiting circuit further comprises a current-limiting circuit that comprises a first current-limiting resistance, a second current-limiting resistance and a second controllable switch, wherein, the first current-limiting resistance is connected in series in a DC input circuit of the inverter circuit, a first end of the second current-limiting resistance is connected to a first end of the second controllable switch, a second end of the second current-limiting resistance and a second end of the second controllable switch are respectively connected to two ends of the first current-limiting resistance, a control end of the second controllable switch is connected to an output end of the first logic judging circuit for controlling the second controllable switch to disconnect when receiving said first signal.

Optionally, the first current-limiting resistance comprises at least two resistances connected in parallel; and/or, the second current-limiting resistance comprises at least two resistances connected in parallel.

Optionally, the power limiting circuit further comprises a current sampling circuit for sampling the input current of the inverter circuit of the inverter device, wherein the current sampling circuit comprises a sampling resistance connected in series in a DC input circuit of the inverter circuit.

Optionally, the sampling resistance comprises at least two resistances connected in parallel.

Optionally, the first logic judging circuit comprises a comparator.

Optionally, the power limiting circuit further comprises a second logic judging circuit for comparing the input current of the inverter circuit with a second preset current threshold and outputting a second signal when said input current is larger than the second preset current threshold, the second preset current threshold being larger than the first preset current threshold;

an output end of the second logic judging circuit is connected to a drive circuit for a DC-DC converter circuit of the inverter device, for disconnecting the DC-DC converter circuit when outputting said second signal and maintaining the DC-DC converter circuit at a disconnected state.

Optionally, the output end of the second logic judging circuit is also connected to a drive circuit for the inverter circuit, for disconnecting the inverter circuit when outputting said second signal.

Optionally, the power limiting circuit further comprises an input power limiting circuit that comprises an input current sampling circuit, an input voltage sampling circuit and an adder, wherein, the input current sampling circuit is for sampling the input current of a DC-DC converter circuit of the inverter device and transforming the sampled current signal into corresponding voltage signal;

the input voltage sampling circuit is for sampling the input voltage of the DC-DC converter circuit of the inverter device the adder is for adding together the voltage signal outputted by the input current sampling circuit and the voltage signal outputted by the input voltage sampling circuit so as to judge whether the input power of the inverter device exceeds a preset power threshold;

the adder is connected to a drive circuit for the DC-DC converter circuit of the inverter device, for lowering the output voltage of the DC-DC converter circuit when the input power of the inverter device exceeds the preset power threshold.

Optionally, the input power limiting circuit further comprises a voltage regulating circuit and a current regulating circuit, wherein, the voltage regulating circuit is for regulating the amplitude of the voltage signal outputted by the input voltage sampling circuit, and the current regulating circuit is for regulating the voltage signal outputted by the input current sampling circuit.

An inverter device comprises a DC-DC converter circuit and an inverter circuit connected in series; a drive circuit for the DC-DC converter circuit; a drive circuit for the inverter circuit; and a processor for controlling the drive circuit for the DC-DC converter circuit and the drive circuit for the inverter circuit; it also comprises a power limiting circuit as mentioned above.

The technical scheme of the present invention has the following advantages:

(1) In the power limiting circuit for an inverter device provided by the embodiments of the present invention, there is provided a shunt resistance R125 which is connected in parallel to the input ends of inverter circuit after the shunt resistance R125 is connected in series with a MOSFET tube used as a first controllable switch Q15, the gate electrode of this MOSFET tube is used as a control end that is connected to the output end of the first logic judging circuit. When the input current (DC circuit current) of the inverter circuit exceeds a first preset current threshold, the MOSFET tube closes to connect the shunt resistance R125 in parallel to the DC input circuit of the inverter circuit, thereby shunting a part of the current and thus reduces the input power of the inverter circuit.

(2) The power limiting circuit for an inverter device provided by the embodiments of the present invention further comprises a current-limiting circuit that comprises a first current-limiting resistance, a second current-limiting resistance and a second controllable switch, wherein, the first current-limiting resistance is connected in series in a DC input circuit of the inverter circuit, a first end of the second current-limiting resistance is connected to a first end of the second controllable switch, a second end of the second current-limiting resistance and a second end of the second controllable switch are respectively connected to two ends of the first current-limiting resistance, a control end of the second controllable switch is connected to an output end of the first logic judging circuit for controlling the second controllable switch to disconnect when the input current of the inverter circuit exceeds the first preset current threshold. Because a parallel-connected resistance has a smaller equivalent resistance, it has a smaller voltage-dividing capability and has a smaller current-limiting capability under a certain voltage. When the input current of the inverter circuit is at normal state, i.e. being lower than the first preset current threshold, the parallel-connected first and second current-limiting resistances are both being connected. When the DC input current (input current) of the inverter circuit exceeds a first preset current threshold, the second controllable switch disconnects to cut off the second current-limiting resistance, so that the voltage drop on the first current-limiting resistance increases, and the input current of the inverter circuit decreases correspondingly when the input voltage of the inverter circuit keeps constant or becomes lower. This current-limiting circuit further reduces the input current of the inverter circuit, in addition to the effect of the shunt circuit, and thereby further reduces the power of the inverter circuit.

(3) The power limiting circuit for an inverter device provided by the embodiments of the present invention further comprises a second logic judging circuit, wherein, an output end of the second logic judging circuit is connected to a drive circuit for a DC-DC converter circuit of the inverter device, for disconnecting the DC-DC converter circuit when the input current of the inverter circuit is larger than a second preset current threshold and maintaining the DC-DC converter circuit at a disconnected state. The output end of the second logic judging circuit is also connected to a drive circuit for the inverter circuit, for disconnecting the inverter circuit when the input current of the inverter circuit is larger than the second preset current threshold and maintaining the inverter circuit at a disconnected state. This second logic judging circuit is mainly for protecting the inverter device and the load circuit when a short-circuiting happens.

(4) The power limiting circuit for an inverter device provided by the embodiments of the present invention does not need to accurately acquire the input power of the inverter device, and only needs to judge whether the input power exceeds a preset power threshold, therefore, under the circumstance that the input voltage of the inverter device does not fluctuate much, the input power of the inverter device can be estimated by sampling the input current and input voltage of the inverter device and then processing them with an adder. This method has a simple circuit arrangement and high reliability.

(5) The inverter device provided by the embodiments of the present invention can be directly loaded with an inductive load having a starting current far larger than its rated current. When the inductive load is started, as the output current of the inverter device increases, the current on the input ends of the inverter device increases correspondingly, and if the current on the input ends of the inverter device exceeds the first preset current threshold, it is then judged that the circuit has over-current, i.e. exceeding a maximum working power of the inverter device, and at this time, by shunting and current-limiting, the working power of the inverter device can be reduced. The power limiting circuit for inverter device makes it possible for the inverter device to be directly loaded with an inductive load, while an industrial frequency transformer can be dispensed with, so that the weight of the inverter device is greatly reduced to be easy to move and carry around. Furthermore, the inverter device provided with this power limiting circuit does not need to set a very large maximum working power, instead the maximum working power only needs to be slightly larger than the rated working power of the inductive load, so that the equipment cost is greatly reduced.

BRIEF DESCRIPTION OF THE DRAWINGS

In order to more clearly describe the technical solutions in the specific embodiments of the present invention or in the prior art, hereinafter, the accompanying drawings required to be used in the description of the specific embodiments or the prior art will be briefly introduced. Apparently, the accompanying drawings described below are only directed to some embodiments of the present invention, and for those skilled in the art, without expenditure of creative labor, other drawings can be derived on the basis of these accompanying drawings

DETAILED DESCRIPTION OF EMBODIMENTS

Figure 1:
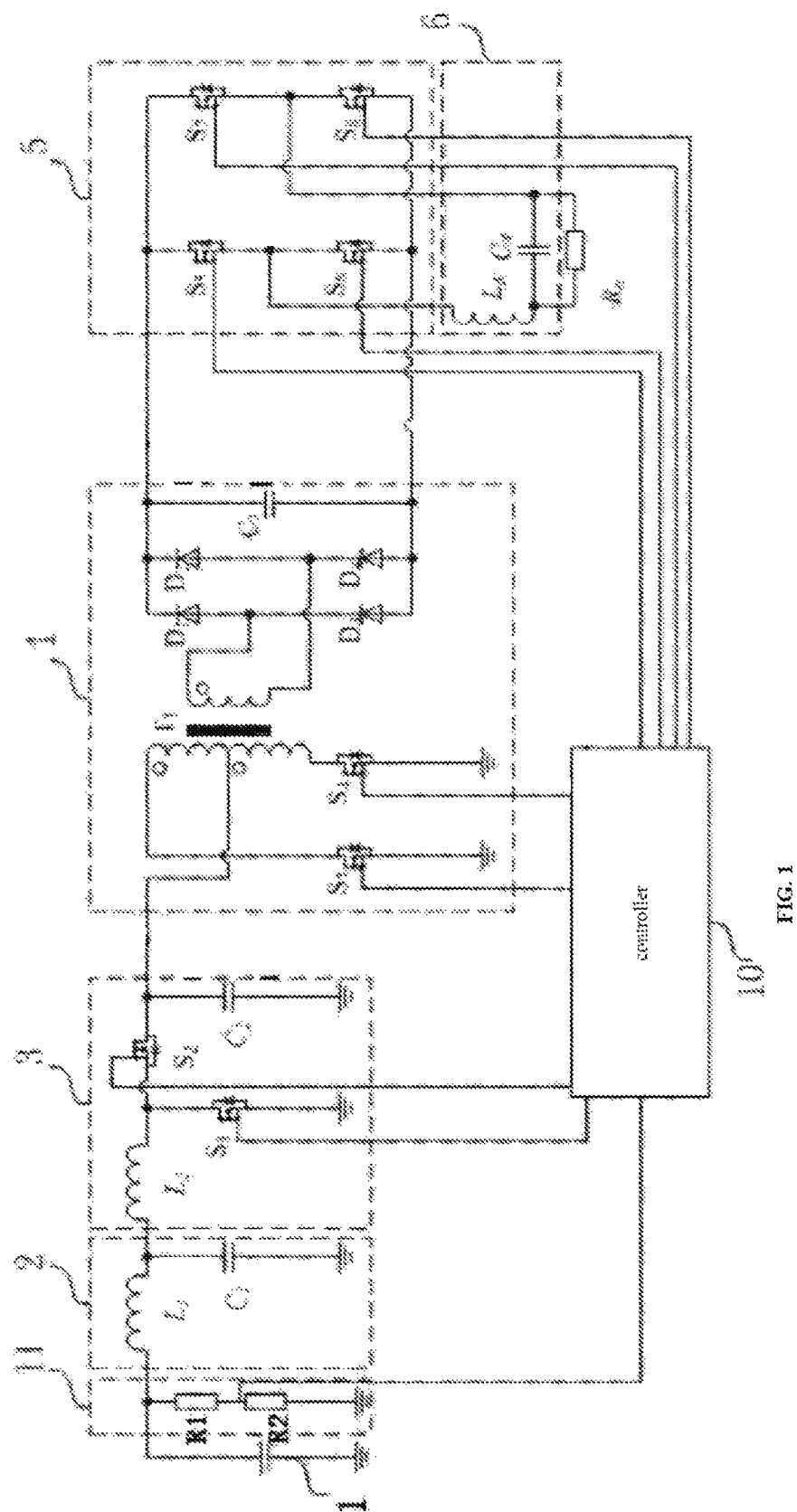
FIG. 1 is a circuit diagram of an inverter device in prior art.

A clear and complete description of the technical solution of the present invention is given below, in conjunction with the accompanying drawings. Apparently, the embodiments described below are a part, but not all, of the embodiments of the present invention. All of the other embodiments, obtained by those skilled in the art on the basis of the embodiments described in the present invention without expenditure of creative labor, fall into the protection scope of the present invention.

In the description of the present disclosure, it needs to be noted that, unless specifically defined or restricted otherwise, the term "connect" should be broadly construed, for example, they may be direct connection, or indirect connection via an intermediate medium, or internal communication between two units; they may be wireless connection or wired connection. For those skilled in the art, the specific meaning of this term in the present invention can be understood according to specific situations thereof.

Furthermore, the technical features involved in the various embodiments of the present invention described below can be combined with one another as long as they do not conflict with one another.

Embodiment 1

As shown in FIG. 2 to FIG. 5, this embodiment provides a power limiting circuit for an inverter device that comprises:

a first logic judging circuit for comparing an input current of an inverter circuit of the inverter device with a first preset current threshold and outputting a first signal when said input current is larger than the first preset current threshold; and a shunt circuit for shunting a portion of the input current of the inverter circuit when receiving said first signal; wherein, the shunt circuit comprises a shunt resistance R125 and a first controllable switch Q15, a first end of the shunt resistance R125 is connected to a first end of the first controllable switch Q15, a second end of the shunt resistance R125 is connected to one input end of the inverter circuit, a second end of the first controllable switch Q15 is connected to the other input end of the inverter circuit, a control end of the first controllable switch Q15 is connected to an output end of the first logic judging circuit for controlling the first controllable switch to be connected when receiving said first signal. In particular, the above-mentioned first controllable switch Q15 is preferably a MOSFET tube (Metal Oxide Semiconductor Field Effect Transistor). The control end of the first controllable switch Q15 is also connected to a processor of the inverter device, so that, when the first controllable switch Q15 has been connected due to that the input current of the inverter circuit is larger than the first preset current threshold, the processor of the inverter device can disconnect the first controllable switch Q15 after a preset duration (e.g. 10 ms), so as to ensure that the inverter device can word normally after the input current of the inverter circuit drops to normal.

In the power limiting circuit for an inverter device provided by this embodiment, there is provided a shunt resistance R125 which is connected in parallel to the input ends of inverter circuit after the shunt resistance R125 is connected in series with a MOSFET tube used as a first controllable switch Q15, the gate electrode of this MOSFET tube is used as a control end that is connected to the output end of the first logic judging circuit. When the input current (DC circuit current) of the inverter circuit exceeds a first preset current threshold, the MOSFET tube closes to connect the shunt resistance R125 in parallel to the DC input circuit of the inverter circuit, thereby shunting a part of the current and thus reduces the input power of the inverter circuit.

Also, because the front side of the inverter circuit in an inverter device usually has a DC-DC converter circuit, and there is at least one capacitor parallel-connected to input ends of the DC-DC converter circuit, mainly for wave filtering and energy storing, and this capacitor is necessary if the inverter device is required to be loaded with an inductive load having a large starting current. Therefore, when the input current of the inverter circuit exceeds the first preset current threshold and the output voltage of the DC-DC converter circuit becomes lower due to the effect of another auxiliary circuit, because of the existence of this capacitor with energy-storing ability, the voltage on input ends of the inverter circuit would not drop immediately, and at this time, the shunt resistance R125 becomes connected to discharge the capacitor, thereby reducing the input voltage of the inverter circuit and thus further reducing the input power of the inverter circuit.

The inverter device provided with this power limiting circuit can be directly loaded with an inductive load having a starting current far larger than its rated current. When the inductive load is started, as the output current of the inverter device increases, the current on the input ends of the inverter device increases correspondingly, and if the current on the input ends of the inverter device exceeds the first preset current threshold, it is then judged that the circuit has over-current, i.e. exceeding a maximum working power of the inverter device, and at this time, the working power of the inverter device can be reduced by shunting. The power limiting circuit for inverter device makes it possible for the inverter device to be directly loaded with an inductive load, while an industrial frequency transformer can be dispensed with, so that the weight of the inverter device is greatly reduced to be easy to move and carry around. Furthermore, the inverter device provided with this power limiting circuit does not need to set a very large maximum working power, instead the maximum working power only needs to be slightly larger than the rated working power of the inductive load, so that the equipment cost is greatly reduced.

Figure 5:
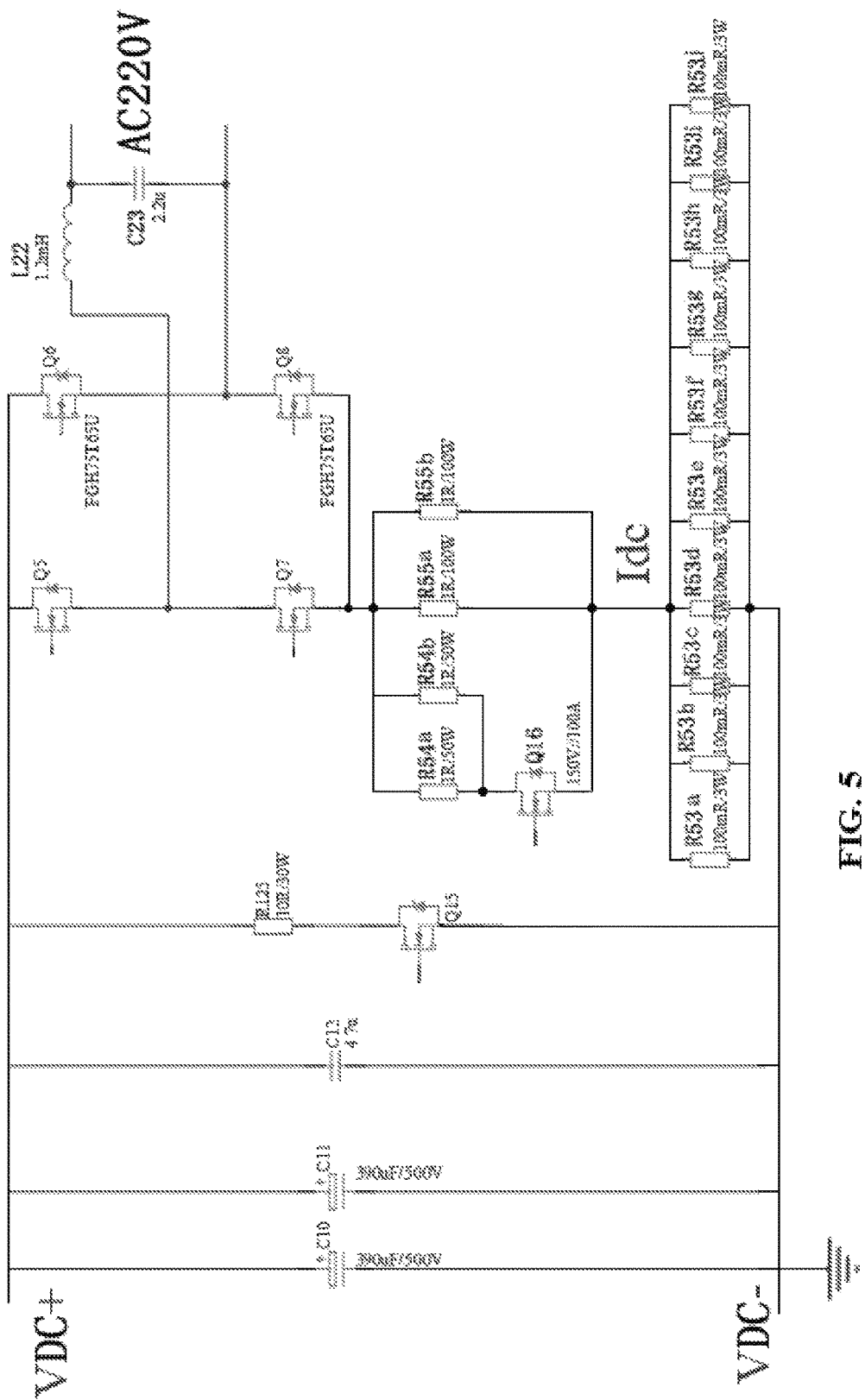
FIG. 5 is a partial circuit diagram of the power limiting circuit for an inverter device in Embodiment 1 of the present invention.

In a more detailed embodiment, the power limiting circuit for an inverter device further comprises a current sampling circuit for sampling the input current of the inverter circuit of the inverter device, i.e. the current in the DC input circuit. Wherein, the inverter bridge in the inverter device is preferably an IGBT tube (Insulated Gate Bipolar transistor). The current sampling circuit comprises a sampling resistance R53 connected in series in the DC input circuit of the inverter circuit. This sampling resistance R53 comprises at least two resistances connected in parallel to increase the rated working power. For example, as shown in FIG. 5, there are ten resistances R53a, R53b, R53c, R53d, R53e, R53f, R53g, R53h, R53i and R53j.

Figure 2:
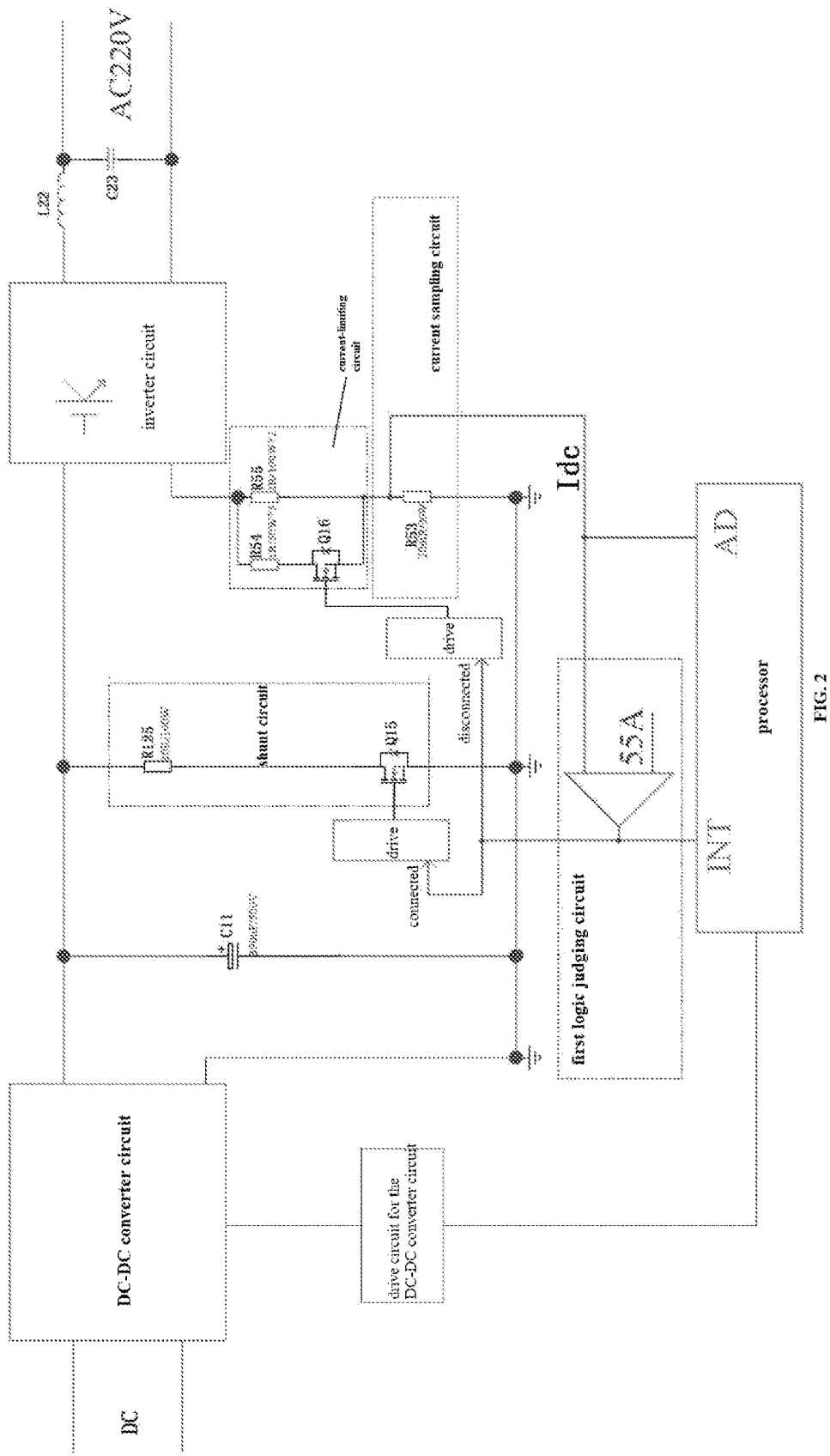
FIG. 2 is a circuit principle diagram of a power limiting circuit for an inverter device in Embodiment 1 of the present invention.
Figure 3:
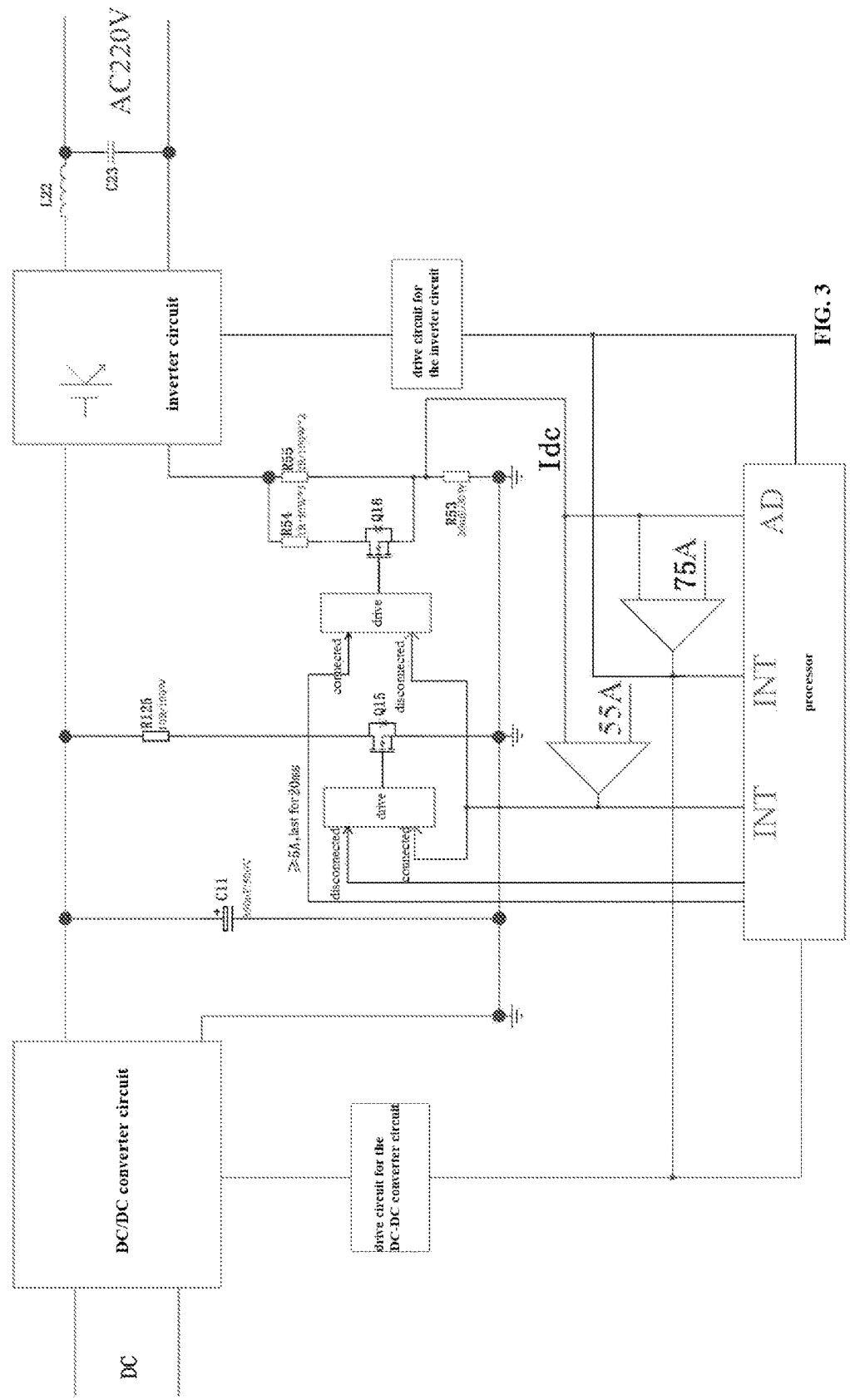
FIG. 3 is a circuit principle diagram of another power limiting circuit in Embodiment 1 of the present invention.
Figure 4:
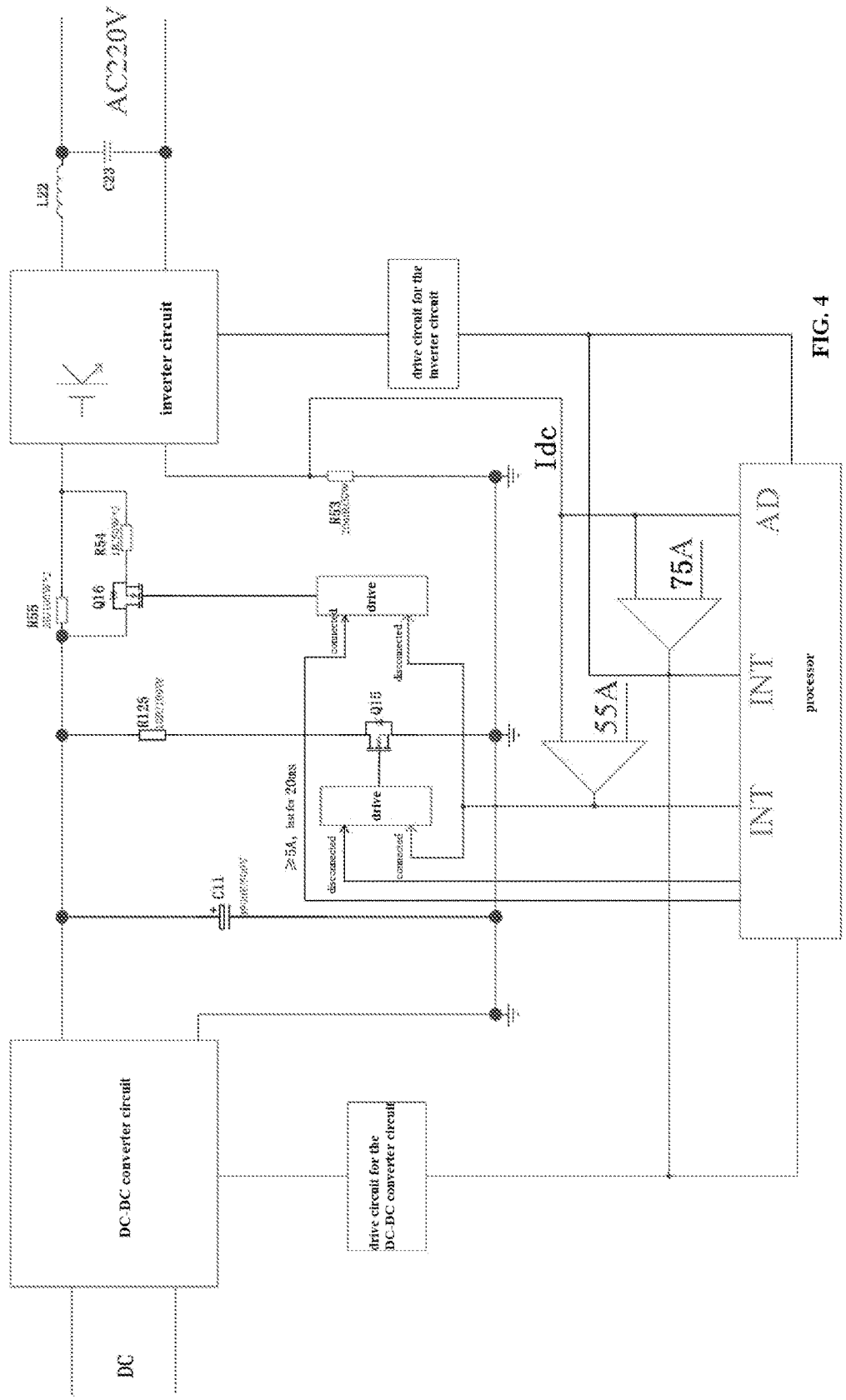
FIG. 4 is a circuit principle diagram of yet another power limiting circuit in Embodiment 1 of the present invention.

In a preferred embodiment, the power limiting circuit for an inverter device further comprises a current-limiting circuit that comprises a first current-limiting resistance R55, a second current-limiting resistance R54 and a second controllable switch Q16, wherein, the first current-limiting resistance R55 is connected in series in a DC input circuit of the inverter circuit, a first end of the second current-limiting resistance R54 is connected to a first end of the second controllable switch Q16, a second end of the second current-limiting resistance R54 and a second end of the second controllable switch Q16 are respectively connected to two ends of the first current-limiting resistance R55, a control end of the second controllable switch Q16 is connected to an output end of the first logic judging circuit for controlling the second controllable switch to disconnect when receiving the first signal, i.e. when the input current of the inverter circuit is larger than the first preset current threshold. In particular, as shown in FIG. 2 to FIG. 3, the above-mentioned sampling resistance R53 has one end directly connected to ground and the other end connected to a first end of this current-limiting circuit (one end of the first current-limiting resistance R55), and a second end of this current-limiting circuit (the other end of the first current-limiting resistance R55) is connected to the DC output end of the inverter circuit. In another embodiment, as shown in FIG. 4, the above-mentioned sampling resistance R53 has one end directly connected to ground and the other end connected to the DC output end of the inverter circuit, while the current-limiting circuit in connected in series in front of the DC input end of the inverter circuit.

Because a parallel-connected resistance has a smaller equivalent resistance, it has a smaller voltage-dividing capability and has a smaller current-limiting capability under a certain voltage. When the input current of the inverter circuit is at normal state, i.e. being lower than the first preset current threshold, the parallel-connected first current-limiting resistance R55 and second current-limiting resistance R54 are both being connected. When the DC input current of the inverter circuit exceeds a first preset current threshold, the second controllable switch Q16 disconnects to cut off the second current-limiting resistance R54, so that the voltage drop on the first current-limiting resistance R55 increases, and the input current of the inverter circuit decreases correspondingly when the input voltage of the inverter circuit keeps constant or becomes lower. This current-limiting circuit further reduces the input current of the inverter circuit, in addition to the effect of the shunt circuit, and thereby further reduces the power of the inverter circuit.

In particular, in order to ensure the disconnecting speed of the second controllable switch Q16 for circuit safety, the disconnecting of the above-mentioned second controllable switch Q16 should be directly controlled by a first signal outputted by the first logic judging circuit, that is to say, the electric signal outputted by the first logic judging circuit directly enters the drive circuit of the second controllable switch Q16, instead of going through the processor of the inverter device and then use a control signal outputted by the processor for controlling. However, the recovering of the second controllable switch Q16 after being disconnected is controlled by the processor. In this embodiment, after the shunt circuit and the current-limiting circuit, the input current of the inverter circuit decreases accordingly, and after the input current of the inverter circuit stays at 5 A≤Idc<55 A for 20 ms, the processor automatically controls the second controllable switch Q16 to close. Also, in this embodiment, in order to prevent the situation that the input current of the inverter circuit surges above the first preset current threshold at the moment of connecting the load (due to over-current or short-circuiting), the second controllable switch Q16 is kept at the disconnected state when the inverter device is not connected to a load or when the input current of the inverter circuit is lower than 5 A, and only becomes closed after the input current of the inverter circuit stays at 5 A<Idc<55 A for 20 ms.

In particular, the first current-limiting resistance R55 comprises at least two resistances connected in parallel, for example, the resistances R55a, R55b shown in FIG. 5. The second current-limiting resistance R54 comprises at least two resistances connected in parallel, for example, the resistances R54a, R54b shown in FIG. 5. Parallel-connecting can divide the current, so as to greatly increase the rated power of the current-limiting circuit. In practical implementation, the first current-limiting resistance R55 can be a resistance group, for example consisting of multiple resistances connected in parallel, or multiple resistances connected in series, or multiple resistances connected in series and then in parallel. The second current-limiting resistance R54 may also be a resistance group.

In a more detailed embodiment, the first logic judging circuit comprises a comparator for comparing the current signal outputted by the current sampling circuit, i.e. the input current of the inverter circuit, to determine whether it is larger than the first preset current threshold. The input current of the inverter circuit can be converted to a voltage value by means of the sampling resistance R53, and then the signal value is regulated to a suitable range to be inputted into the comparator and at the same time inputted into the processor of the inverter device. The first preset current threshold goes through similar converting and regulating process to be converted into a corresponding voltage value to be inputted into the other input end of the comparator.

In a preferred embodiment, as shown in FIG. 3 and FIG. 4, the power limiting circuit for an inverter device further comprises a second logic judging circuit for comparing the current signal outputted by the current sampling circuit (the input current of the inverter circuit) with a second preset current threshold and outputting a second signal when said input current is larger than the second preset current threshold, the second preset current threshold being larger than the first preset current threshold. This second logic judging circuit also comprises a comparator.

An output end of the second logic judging circuit is connected to a drive circuit for a DC-DC converter circuit of the inverter device, for disconnecting the DC-DC converter circuit when outputting said second signal, i.e. when the input current of the inverter circuit is larger than the second preset current threshold, and maintaining the DC-DC converter circuit at a disconnected state. Herein, the output end of the second logic judging circuit is not necessarily connected directly to the drive circuit for the DC-DC converter circuit, instead, it may be connected to a controller of the DC-DC converter circuit or a processor of the inverter device, and then the controller of the DC-DC converter circuit or the processor of the inverter device controls the drive circuit to make adjustments. However, in order to disconnect the DC-DC converter circuit at the quickest speed, the second logic judging circuit in this embodiment directly uses analog signal to control the drive circuit for the DC-DC converter circuit, so as to quickly disconnect the DC-DC converter circuit.

When the input current of the inverter circuit is larger than the second preset current threshold, a short-circuiting is considered to happen. As such, the second logic judging circuit is also connected to a drive circuit for the inverter circuit, for quickly disconnecting the inverter circuit. This second logic judging circuit is mainly for protecting the inverter device and the load circuit when a short-circuiting happens.

Embodiment 2

Figure 6:
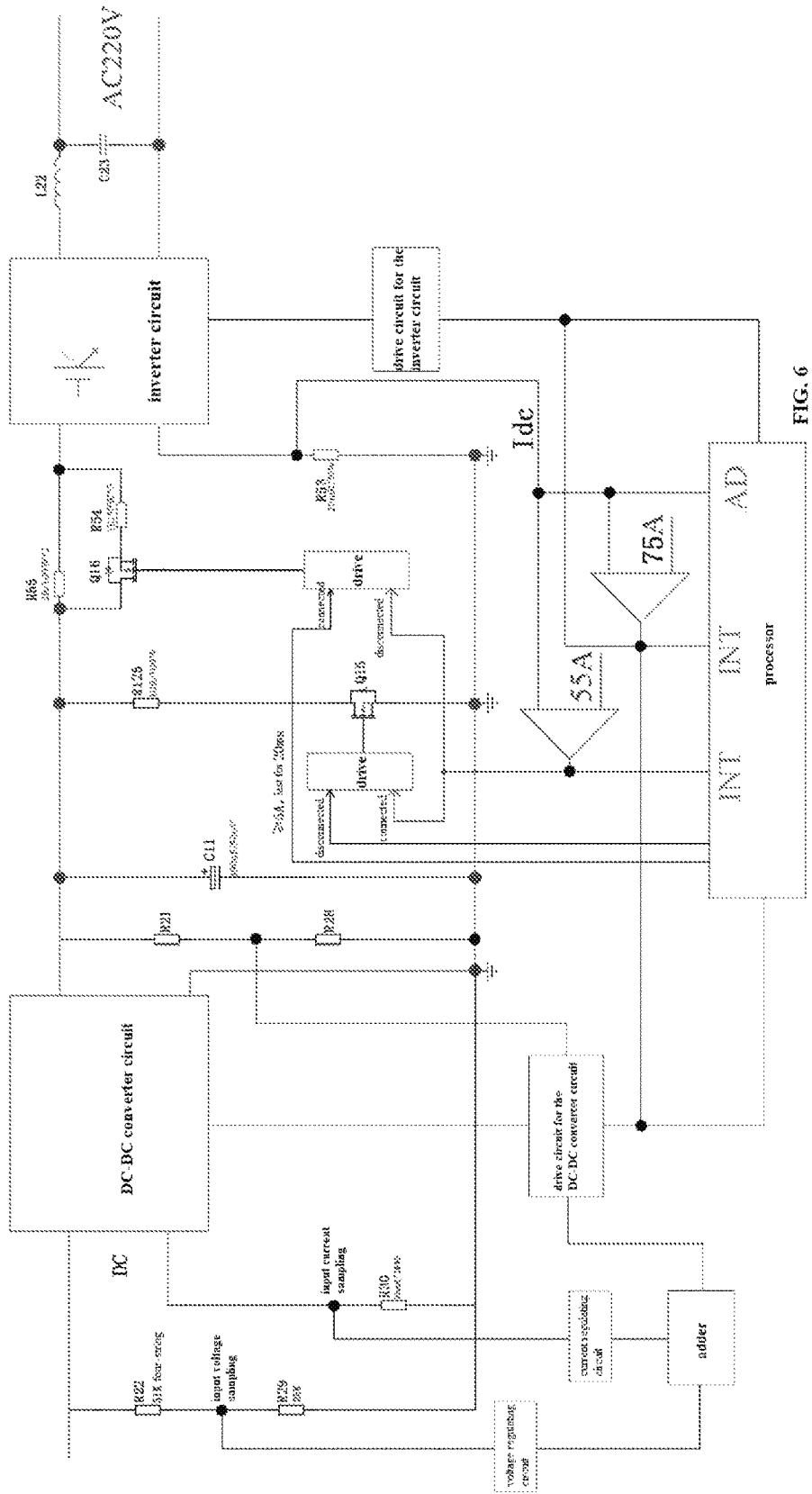
FIG. 6 is a circuit principle diagram of a power limiting circuit for an inverter device in Embodiment 2 of the present invention

As shown in FIG. 6, this embodiment provides a power limiting circuit for an inverter device, and as compared to Embodiment 1 above, its difference lies in that: it also comprises an input power limiting circuit that comprises an input current sampling circuit, an input voltage sampling circuit and an adder.

The input current sampling circuit is for sampling the input current of a DC-DC converter circuit of the inverter device and transforming the sampled current signal into corresponding voltage signal. In particular, the current on an input circuit of the DC-DC converter circuit is sampled.

The input voltage sampling circuit is for sampling the input voltage of the DC-DC converter circuit of the inverter device. In particular, the voltage is sampled by means of a first voltage-dividing resistance R22 and a second voltage-dividing resistance R29.

The adder is for adding the voltage signal outputted by the input current sampling circuit and the voltage signal outputted by the input voltage sampling circuit so as to judge whether the input power of the inverter device exceeds a preset power threshold.

The adder is connected to a drive circuit for the DC-DC converter circuit of the inverter device, for lowering the output voltage of the DC-DC converter circuit when the input power of the inverter device exceeds the preset power threshold.

The power limiting circuit for an inverter device provided by this embodiment does not need to accurately acquire the input power of the inverter device, and only needs to judge whether the input power exceeds a preset power threshold, therefore, under the circumstance that the input voltage of the inverter device does not fluctuate much, the input power of the inverter device can be estimated by sampling the input current and input voltage of the inverter device and then processing them with an adder. This method has a simple circuit arrangement and high reliability.

At the starting stage of an inductive load, because of its large starting current, its starting power is also much larger than its rated power. In order to enable the inverter device to be loaded with an inductive load, in prior art, one of the solutions is to provide an industrial frequency transformer at the input side of the inverter device, and another solution is to design the working power of the inverter device to fulfill the starting power requirement of the inductive load. However, the industrial frequency transformer is bulky and has a large weight, which brings about inconveniency of being carried around and moved; the inductive load only has a large power when starting, and when it runs normally, it has a rated power that is far lower than its starting power, so if the working power of the inverter device is designed to be consistent with the starting power of the inductive load, a big waste would be caused. When using an inverter device provided with this power limiting circuit to supply power to an inductive load, at the starting stage of the inductive load, the input power of the inverter device tends to increase along with the increase of the starting power of the inductive load, and if the input power exceeds a preset power threshold (associated with the rated power of the inverter device), the output voltage thereof is lowered by adjusting the drive circuit of a DC-DC converter circuit, thereby reducing the working power of the DC-DC converter circuit. In the meantime, as the input current of the inverter circuit also tends to increase along with the increase of the starting current, the first logic judging circuit is triggered to output a first signal, and the shunt circuit becomes connected after receiving the first signal, so as to shunt a part of the current and thereby reduce the working power of the inverter circuit. The current-limiting circuit also disconnects the parallel-connected second current-limiting resistance R54 by means of the second controllable switch Q16 which is controlled by the first signal to disconnect, so that the voltage-dividing capability of the first current-limiting resistance R55 is greatly increased, thereby further reducing the input current of the inverter circuit and thus further reducing the input power of the inverter circuit.

Also, in order to enable the inverter device to be loaded with a load having a large starting current, a capacitor C11 with energy-storing capability needs to be connected in parallel to output ends of its DC-DC converter circuit, and this capacitor C11 also has wave-filtering effect. When the input power of the inverter device exceeds the preset power threshold and the above-mentioned input power limiting circuit is used to reduce the output voltage of the DC-DC converter circuit, because of the existence of this parallel-connected capacitor C11, the input voltage of the inverter circuit would not drop immediately. At this time, the above-mentioned shunt circuit may form a discharging circuit with the capacitor C11 to quickly reduce the voltage on the capacitor C11, thereby quickly reducing the input voltage of the inverter circuit and thus quickly reducing the input power of the inverter circuit.

Consequently, the power limiting circuit for an inverter device provided by this embodiment reduces the power of the inverter device when an inductive load is started by means of reducing the voltage as well as adding a shunt resistance, so as to render the inverter device able to be loaded with an inductive load having a starting power far larger than its rated power, without using an industrial frequency transformer. As the power limiting circuit for an inverter device provided by this embodiment reduces the power of the inverter device by reducing the output voltage, it is mainly suitable for outdoor mobile power usage. Because, for a mobile electrical appliance with its power not directly supplied from a power grid, a relatively small power (smaller than 3 kW) is needed, and the quality requirement is low for the voltage waveform of outputted by the power supply source, which allows voltage distortion.

In a more detailed embodiment, the input power limiting circuit further comprises a voltage regulating circuit and a current regulating circuit, wherein, the voltage regulating circuit is for regulating the amplitude of the voltage signal outputted by the input voltage sampling circuit, and the current regulating circuit is for regulating the voltage signal outputted by the input current sampling circuit. In this embodiment, by regulating the signal outputted by the input voltage sampling circuit and the signal outputted by the input current sampling circuit, the accuracy for estimating the input power of the inverter device is improved, and the amplitude requirement for input signal of a logic judging circuit can be met. The above-mentioned preset power threshold is also regulated correspondingly and then used as a judging reference value.

Embodiment 3

This embodiment provides an inverter device that comprises a DC-DC converter circuit and an inverter circuit connected in series; a drive circuit for the DC-DC converter circuit; a drive circuit for the inverter circuit; and a processor for controlling the drive circuit for the DC-DC converter circuit and the drive circuit for the inverter circuit; it also comprises a power limiting circuit for an inverter device as described in Embodiment 1 or 2 above.

Also, a capacitor C11 is connected in parallel to output ends of the DC-DC converter circuit. This capacitor C11 has wave-filtering function as well as energy-storing function. When the inverter circuit needs to be loaded with a load having a large starting current, this capacitor C11 with energy-storing function is indispensable. In practical implementation, multiple capacitors (which may be an electrolytic capacitor) connected in parallel may be arranged to carry out the wave-filtering and energy-storing functions.

The inverter device provided by this embodiment can be directly loaded with an inductive load having a starting current far larger than its rated current. When the inductive load is started, as the output current of the inverter device increases, the current on the input ends of the inverter device increases correspondingly, and if the current on the input ends of the inverter device exceeds the first preset current threshold, it is then judged that the circuit has over-current, i.e. exceeding a maximum working power of the inverter device, and at this time, by shunting and current-limiting, the working power of the inverter device can be reduced. In the meantime, as the starting current of the inductive load increases, the input power of the inverter device may also exceed the preset power threshold, and at this time, the output voltage thereof can be lowered by adjusting the drive circuit of a DC-DC converter circuit, thereby reducing the power of the inverter device. The power limiting circuit for inverter device makes it possible for the inverter device to be directly loaded with an inductive load, while an industrial frequency transformer can be dispensed with, so that the weight of the inverter device is greatly reduced to be easy to move and carry around. Furthermore, the inverter device provided with this power limiting circuit does not need to set a very large maximum working power, instead the maximum working power only needs to be slightly larger than the rated working power of the inductive load, so that the equipment cost is greatly reduced.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

I claim:

1. A power limiting circuit for an inverter device, characterized in comprising
   a first logic judging circuit for comparing an input current of an inverter circuit of the inverter device with a first preset current threshold and outputting a first signal when said input current is larger than the first preset current threshold; and
   a shunt circuit for shunting a portion of the input current of the inverter circuit when receiving said first signal; wherein, the shunt circuit comprises a shunt resistance and a first controllable switch, a first end of the shunt resistance is connected to a first end of the first controllable switch, a second end of the shunt resistance is connected to one input end of the inverter circuit, a second end of the first controllable switch is connected to the other input end of the inverter circuit, a control end of the first controllable switch is connected to an output end of the first logic judging circuit for controlling the first controllable switch to be connected when receiving said first signal; and
   a second logic judging circuit for comparing the input current of the inverter circuit with a second preset current threshold and outputting a second signal when said input current is larger than the second preset current threshold, the second preset current threshold being larger than the first preset current threshold;
   an output end of the second logic judging circuit is connected to a drive circuit for a DC-DC converter circuit of the inverter device, for disconnecting the DC-DC converter circuit when outputting said second signal and maintaining the DC-DC converter circuit at a disconnected state.

2. The power limiting circuit of claim 1, characterized in that, the control end of the first controllable switch is also connected to a processor of the inverter device for disconnecting the first controllable switch after a preset duration of connection of the first controllable switch.

3. The power limiting circuit of claim 1, characterized in further comprising a current sampling circuit for sampling the input current of the inverter circuit of the inverter device, wherein the current sampling circuit comprises a sampling resistance connected in series in a DC input circuit of the inverter circuit.

4. The power limiting circuit of claim 1, characterized in that, the output end of the second logic judging circuit is also connected to a drive circuit for the inverter circuit, for disconnecting the inverter circuit when outputting said second signal.

5. The power limiting circuit of claim 1, characterized in further comprising an input power limiting circuit that comprises an input current sampling circuit, an input voltage sampling circuit and an adder, wherein,
   the input current sampling circuit is for sampling the input current of the DC-DC converter circuit of the inverter device and transforming the sampled current signal into corresponding voltage signal;
   the input voltage sampling circuit is for sampling the input voltage of the DC-DC converter circuit of the inverter device the adder is for adding together the voltage signal outputted by the input current sampling circuit and the voltage signal outputted by the input voltage sampling circuit so as to judge whether the input power of the inverter device exceeds a preset power threshold;
   the adder is connected to a drive circuit for the DC-DC converter circuit of the inverter device, for lowering the output voltage of the DC-DC converter circuit when the input power of the inverter device exceeds the preset power threshold.

6. The power limiting circuit of claim 1, characterized in that, the input power limiting circuit further comprises a voltage regulating circuit and a current regulating circuit, wherein, the voltage regulating circuit is for regulating the amplitude of the voltage signal outputted by the input voltage sampling circuit, and the current regulating circuit is for regulating the voltage signal outputted by the input current sampling circuit.

7. The power limiting circuit of claim 1, characterized in further comprising a current-limiting circuit that comprises a first current-limiting resistance, a second current-limiting resistance and a second controllable switch, wherein, the first current-limiting resistance is connected in series in a DC input circuit of the inverter circuit, a first end of the second current-limiting resistance is connected to a first end of the second controllable switch, a second end of the second current-limiting resistance and a second end of the second controllable switch are respectively connected to two ends of the first current-limiting resistance, a control end of the second controllable switch is connected to an output end of the first logic judging circuit for controlling the second controllable switch to disconnect when receiving said first signal.

8. The power limiting circuit of claim 7, characterized in that, the first current-limiting resistance comprises at least two resistances connected in parallel; and/or, the second current-limiting resistance comprises at least two resistances connected in parallel.

9. An inverter device, comprising
   a DC-DC converter circuit and an inverter circuit connected in series;
   a drive circuit for the DC-DC converter circuit;
   a drive circuit for the inverter circuit; and
   a processor for controlling the drive circuit for the DC-DC converter circuit and the drive circuit for the inverter circuit;
   characterized in further comprising a power limiting circuit that comprises:

a first logic judging circuit for comparing an input current of an inverter circuit of the inverter device with a first preset current threshold and outputting a first signal when said input current is larger than the first preset current threshold; and a shunt circuit for shunting a portion of the input current of the inverter circuit when receiving said first signal; wherein, the shunt circuit comprises a shunt resistance and a first controllable switch, a first end of the shunt resistance is connected to a first end of the first controllable switch, a second end of the shunt resistance is connected to one input end of the inverter circuit, a second end of the first controllable switch is connected to the other input end of the inverter circuit, a control end of the first controllable switch is connected to an output end of the first logic judging circuit for controlling the first controllable switch to be connected when receiving said first signal; and a second logic judging circuit for comparing the input current of the inverter circuit with a second preset current threshold and outputting a second signal when said input current is larger than the second preset current threshold, the second preset current threshold being larger than the first preset current threshold;

an output end of the second logic judging circuit is connected to the drive circuit for the DC-DC converter circuit of the inverter device, for disconnecting the DC-DC converter circuit when outputting said second signal and maintaining the DC-DC converter circuit at a disconnected state.

* * * * *